United States Patent
Rosen et al.

(10) Patent No.: US 6,684,070 B1
(45) Date of Patent: Jan. 27, 2004

(54) TDMA BEACON FOR SATELLITE SYSTEM SYNCHRONIZATION

(75) Inventors: Harold A. Rosen, Santa Monica, CA (US); Arnold L. Berman, Los Angeles, CA (US); Chak M. Chie, Culver City, CA (US)

(73) Assignee: Hughes Electronics Corporation, El Segundo, CA (US)

( * ) Notice: Subject to any disclaimer, the term of this patent is extended or adjusted under 35 U.S.C. 154(b) by 589 days.

(21) Appl. No.: 09/670,987

(22) Filed: Sep. 26, 2000

(51) Int. Cl.[7] .................................................. H04Q 7/20
(52) U.S. Cl. ........................................ 455/427; 370/324
(58) Field of Search ............................... 455/3.02, 3.01, 455/13.2, 12.1, 427, 428, 429, 430, 502, 503; 370/324, 514, 515, 316, 319, 321, 347

(56) References Cited

U.S. PATENT DOCUMENTS

| | | | | |
|---|---|---|---|---|
| 3,740,478 A | * | 6/1973 | Breant et al. ................ | 370/515 |
| 3,838,221 A | * | 9/1974 | Schmidt et al. .............. | 370/324 |
| 3,854,011 A | * | 12/1974 | Mallory et al. .............. | 370/510 |
| 4,398,291 A | * | 8/1983 | Hotta et al. .................. | 370/323 |
| 6,333,922 B1 | * | 12/2001 | Campanella ................. | 370/319 |

* cited by examiner

Primary Examiner—Nay Maung
Assistant Examiner—Nick Corsaro
(74) Attorney, Agent, or Firm—Terje Gudmestad

(57) ABSTRACT

A TDMA beacon for satellite system synchronization includes a beacon signal generator and a time division multiplexed switch. The beacon signal generator generates a beacon signal. The TDM switch is coupled to the beacon signal generator and receives the beacon signal. The TDM switch embeds the beacon signal with a data signal into a TDMA signal. The TDMA signal is then broadcast to a ground station where the beacon signal may be extracted from the TDMA signal and used to synchronize a terminal with the satellite system.

11 Claims, 2 Drawing Sheets

TDMA BEACON FOR SATELLITE SYSTEM SYNCHRONIZATION

TECHNICAL FIELD

The present invention relates generally to satellite communication systems, and more particularly to a time division multiple access (TDMA) beacon for satellite system synchronization.

BACKGROUND ART

Satellites and other spacecraft are in widespread use for various purposes including scientific research and communications. These scientific and communications missions, however, cannot be accurately fulfilled without uploading and downloading electronic data. In many applications, the satellite relies upon uploading and downloading electronic data for position correction or system diagnostics. In other applications, the satellite acts as a relay to transfer data between two remote points on the Earth. Without the capability to receive and transmit electronic data, proper satellite function is hindered and at times impossible.

Many modem spacecraft act as relays to transfer data between two or more points on the Earth. There are several types of electronic data that these satellites broadcast. These include timing beacon synchronization data, multi-cast/broadcast data service, calibration data, and point-to-point data service. Unfortunately, typical satellites require separate antennas and the electronics required for each antenna for each of the above functions.

For example, a satellite beacon signal is required by a terminal to synchronize time for a TDMA satellite communications system. The beacon signal typically has its own waveform and is generated independent of data transmissions. To conserve satellite power, the beacon is allocated relatively low EIRP. To conserve spectrum, the beacon occupies a small fraction of the downlink bandwidth. To minimize interference with the main data transmission, the beacon is usually located at the edge of the allocated band.

In addition to the added complexity in the generation and recovery of the beacon signal, the conventional approach has a number of inherent problems. First, there is a concern with possible interference from the main data transmission. Second, a small bandwidth can limit the timing accuracy of the beacon. Finally, the timing biases between the data transmission and the beacon signal due to different hardware paths typically need to be calibrated and eliminated.

The disadvantages associated with these conventional satellite system synchronization techniques have made it apparent that a new technique for satellite system synchronization is needed. The new technique should reduce complexity in the generation and recovery of the beacon signal and should not create interference with main data transmission. Additionally, the new technique should have higher timing beacon accuracy, while eliminating timing biases between the data transmission and the beacon signal. The present invention is directed to these ends.

SUMMARY OF THE INVENTION

It is, therefore, an object of the invention to provide an improved and reliable TDMA beacon for satellite system synchronization. Another object of the invention is to reduce complexity in the generation and recovery of the beacon signal. An additional object of the invention is to eliminate inference with main data transmission.

In accordance with the objects of this invention, a TDMA beacon for satellite system synchronization is provided. In one embodiment of the invention, a TDMA beacon for satellite system synchronization includes a beacon signal generator and a time division multiplexed switch. The beacon signal generator generates a beacon signal. The TDM switch is coupled to the beacon signal generator and receives the beacon signal. The TDM switch embeds the beacon signal with a data signal into a TDMA signal. The TDMA signal is then broadcast to a ground station where the beacon signal may be extracted from the TDMA signal and used to synchronize a terminal with the satellite system.

The present invention thus achieves an improved TDMA beacon for satellite system synchronization. The present invention is advantageous in that it allows higher timing beacon accuracy, while eliminating timing biases between the data transmission and the beacon signal Additional advantages and features of the present invention will become apparent from the description that follows, and may be realized by means of the instrumentalities and combinations particularly pointed out in the appended claims, taken in conjunction with the accompanying drawings.

BRIEF DESCRIPTION OF THE DRAWINGS

In order that the invention may be well understood, there will now be described some embodiments thereof, given by way of example, reference being made to the accompanying drawings, in which.

BEST MODES FOR CARRYING OUT THE INVENTION

Figure 1:
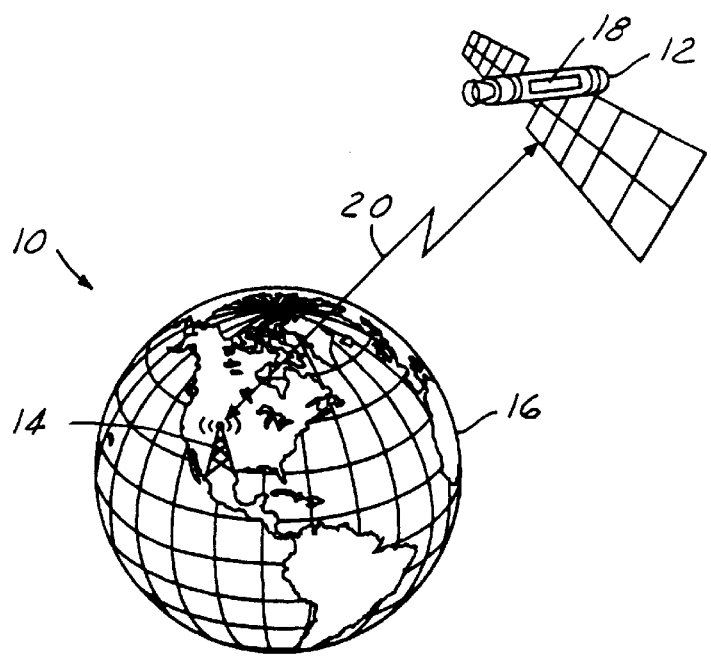
FIG. 1 is a satellite system in accordance with one embodiment of the present invention.

In the following figures, the same reference numerals will be used to identify identical components in the various views. The present invention is illustrated with respect to a TDMA beacon for satellite system synchronization, particularly suited for the aerospace field. However, the present invention is applicable to various other uses that may require TDMA beacon for satellite system synchronization.

Referring to FIG. 1, a perspective view of a satellite system 10 in accordance with one embodiment of the present invention is illustrated. The satellite system 10 is comprised of one or more satellites 12 in communication with a ground station 14 located on the Earth 16. Each satellite 12 contains one or more TDMA beacons 18 for satellite system synchronization for allowing a terminal located in ground station 14 to synchronize time for a TDMA transmission 20.

In a satellite system 10 employing TDMA for multiple access for uplink and downlink transmission 20, data is sent in bursts on the allocated slots in a frame structure. Both satellite 12 and ground station 14 terminal receivers have a dynamic but limited capability to acquire and demodulate the signal within a single burst in the presence of time and frequency errors. The TDMA beacons for satellite system synchronization function is to align satellite and ground station 14 terminal frequencies and timing to allow uplink and downlink communications.

In a satellite-based scheme, the satellite 12 is the time and frequency reference for communication. Even when a satellite 12 is in geo-synchronous orbit with a very small inclination, there are, however, Doppler induced frequency offset and varying time delays that would put signals outside the required limit if they were not corrected.

Two key elements are implemented to provide the necessary synchronization accuracy. First, a global coverage timing beacon signal is transmitted from the satellite 12. It contains frequency and time references to allow the terminal (located in ground station 14) to synchronize to the satellite 12. Second, the satellite ephemeris is disseminated to the terminals so that they may each independently compute their range to the satellite 12 to enable Doppler and time delay correction.

Figure 2:
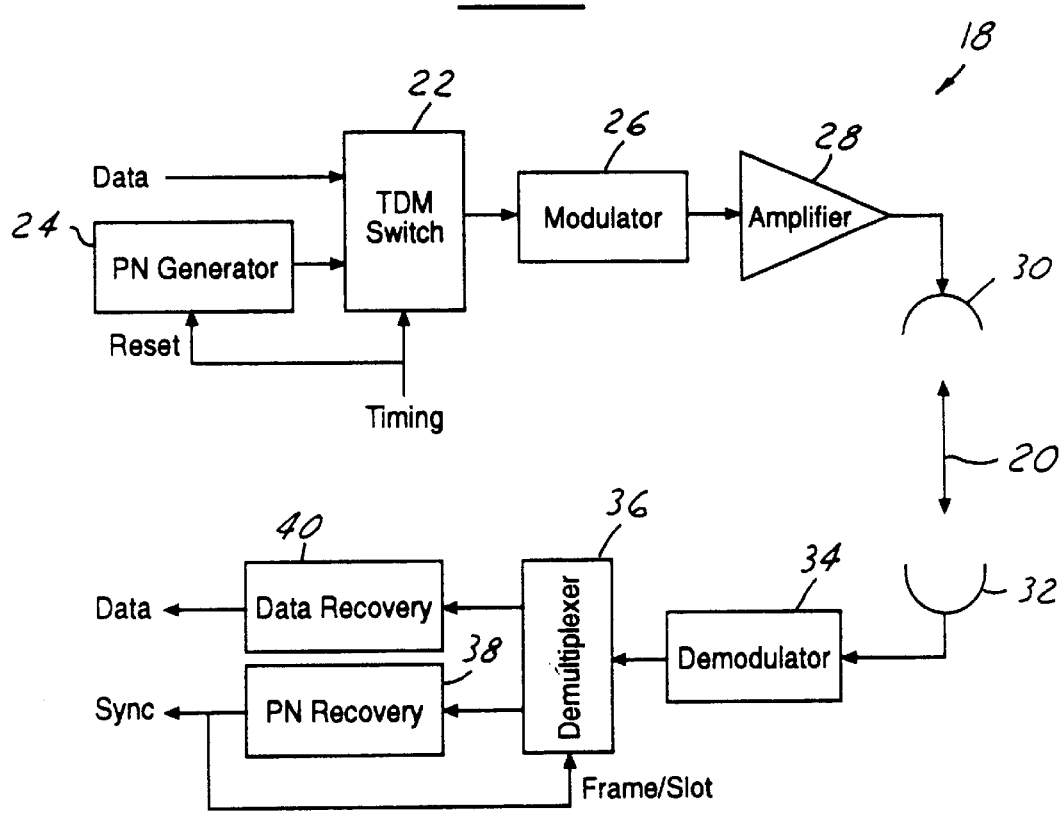
FIG. 2 is a block diagram of a TDMA beacon for satellite system synchronization in accordance with one embodiment of the present invention.

Referring to FIG. 2, a block diagram of a TDMA beacon 18 for satellite system synchronization in accordance with one embodiment of the present invention is illustrated. TDMA beacon 18 includes a time division multiplexed (TDM) switch 22, a pseudo-random number (PN) generator 24, a modulator 26, and an amplifier 28. Both the data and the beacon (PN sequence generated by PN generator 24) are generated in baseband. The TDM switch 22 is used to insert the signals into the proper slots in the downlink frame. The resultant baseband data is used to modulate (using modulator 26) an appropriate RF carrier. After the final stage of power amplification, by amplifier 28, the satellite antenna 30 radiates the signal 20. The composite signal 20 is received by the terminal antenna 32 and demodulated by a demodulator 34. The demodulated signal is then de-multiplexed using de-multiplexer 36 and downlink timing is provided by the beacon receiver (PN recovery loop 38). After the beacon is acquired, clock, slot, and frame timing can be established and data slots can be processed using data recovery electronics 40.

Figure 3:
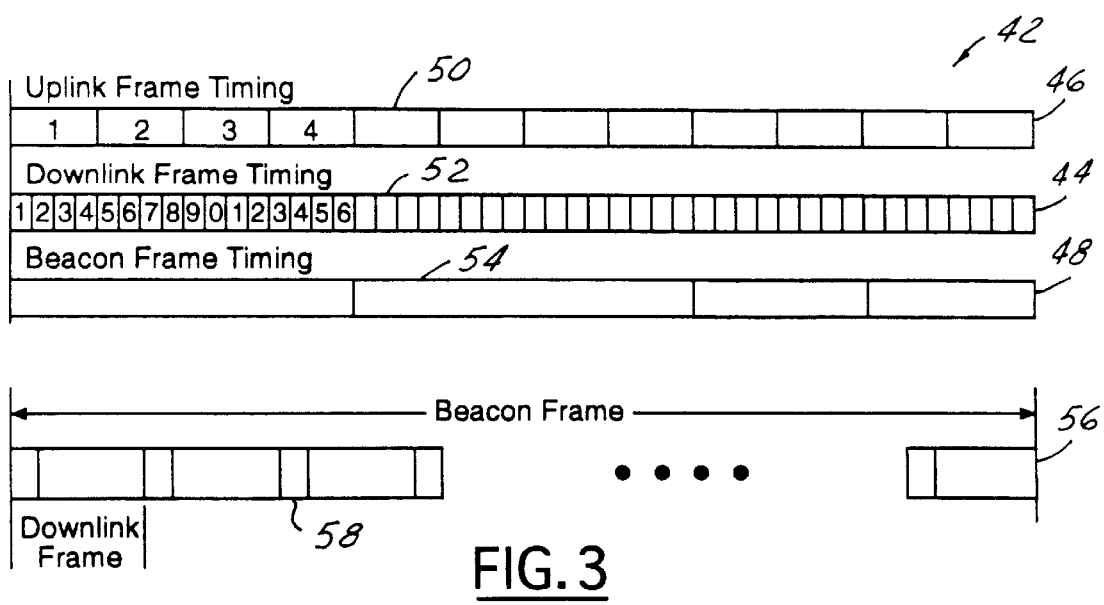
FIG. 3 is an aligned system TDMA framing structure and beacon frame in accordance with one embodiment of the present invention.

Referring to FIG. 3, an aligned system TDMA framing structure and beacon frame 42 in accordance with one embodiment of the present invention is illustrated. The TDMA beacon signal provides frequency and timing references to allow a terminal to synchronize itself with the satellite 12. With the satellite 12 as the reference, a satellite downlink frame 44 and the satellite uplink frame 46 is aligned with the beacon frame 48 at the satellite 12. M uplink frames 50 and N downlink frames 52 fit into a beacon frame 54. The synchronization relationship between the beacon 54, uplink 52 and downlink 50 frame is shown in FIG. 3 for an example of M=4 and N=16. The TDMA beacon is inserted into a fixed slot of each downlink frame 44. As an example, the first slot of each downlink frame 44 is used for beacon frame 56.

A convenient means for time transfer is a pseudorandom (PN) sequence. Each of the beacon slots 58 contains a segment of a PN bit sequence that repeats on the beacon frame 56 as shown in FIG. 3. A fixed initial state of the PN generator identifies the beginning of the first beacon slot in the beacon frame 56. After the PN sequence fills the last slot in the beacon frame 56, the PN generator is re-initialized with the fixed state.

After the TDMA beacon is recovered at the terminal, the locally generated PN clock reference is used as a terminal frequency reference that is coherent with the satellite, after compensating for Doppler. This approach mitigates the need for a highly stable frequency reference for the terminal.

Time is transferred from the satellite 12 via identifying the PN epoch with a time of day (TOD) value from a satellite broadcast message. Using the TOD and satellite ephemeris contained in the message, Doppler can be determined and corrected. The spacecraft 12 maintains the system TOD on-board the spacecraft 12. The spacecraft 12 broadcasts the TOD information synchronized with the TDMA beacon.

The method and system of the present invention provide for an improved TDMA beacon for satellite system synchronization. The present invention reduces complexity in the generation and recovery of the beacon signal and does not create interference with main data transmission. Additionally, the present invention has higher timing beacon accuracy, while eliminating timing biases between the data transmission and the beacon signal. This technique reduces the complexity of both the satellite and user terminal by eliminating the need for a separate satellite transmitter and terminal receiver for the beacon signal.

From the foregoing, it can be seen that there has been brought to the art a new and improved TDMA beacon for satellite system synchronization. It is to be understood that the preceding description of the preferred embodiment is merely illustrative of some of the many specific embodiments that represent applications of the principles of the present invention. Clearly, numerous and other arrangements would be evident to those skilled in the art without departing from the scope of the invention as defined by the following claims:

What is claimed is:

1. A TDMA beacon for satellite system synchronization comprising:

a beacon signal generator capable of generating a beacon signal, said beacon signal generator is a pseudorandom number generator reset to a preset state using a reset signal;

a TDM switch coupled to said beacon signal generator and receiving said beacon signal, said TDM switch multiplexing a data signal into N downlink frame slots based on a timing signal to generate a TDMA signal, wherein one of said N downlink frame slots comprises said beacon signal;

a modulator coupled to said TDM switch and receiving said TDMA signal, said modulator modulating said TDMA signal;

a demodulator remote from said modulator, said demodulator demodulating said TDMA signal;

a beacon receiver coupled to said demodulator and receiving said TDMA signal, said beacon receiver extracting said beacon signal from said one of said N downlink frame slots for timing synchronization; and data recovery electronics coupled to said demodulator and receiving said TDMA signal, said data recovery electronics synchronized with said TDM switch based upon said beacon signal, said data recovery electroics generating said data signal.

2. The TDMA beacon for satellite system synchronization as recited in claim 1, wherein said beacon signal is a pseudorandom number sequence.

3. The TDMA beacon (18) for satellite (12) system synchronization as recited in claim 1, wherein said beacon signal and said data signals are generated at baseband.

4. The TDMA beacon (18) for satellite (12) system synchronization as recited in claim 1, wherein said beacon signal defines said downlink frame structure.

5. The TDMA beacon (18) for satellite (12) system synchronization as recited in claim 1, wherein said beacon signal and said data signal share a same radio frequency and interference frequency path.

6. A processing satellite communication system comprising:
 a ground station;
 a satellite in orbit and in communication with said ground station, said satellite having a TDMA beacon for satellite system synchronization comprising:
  a beacon signal generator located in said satellite capable of generating a beacon signal, said beacon signal generator is a pseudorandom number generator Mat is reset to a preset state using a reset signal;
  a TDM switch located in said satellite and coupled to said beacon signal generator and receiving said beacon signal, said TDM switch multiplexing a data signal into N downlink frame slots based on a timing signal to generate a TDMA signal, wherein one of said N downlink frame slots comprises said beacon signal;
  a modulator located in said satellite and coupled to said TDM switch and receiving said TDMA signal, said modulator modulating said TDMA signal;
  a demodulator located in said ground station said demodulator demodulating said TDMA signal;
  a beacon receiver located in said ground station and coupled to said demodulator and receiving said TDMA signal, said beacon receiver extracting said beacon signal from said one of said N downlink frame slots for timing synchronization; and
  data recovery electronics located in said ground station and coupled to said demodulator and receiving said TDMA signal, said data recovery electronics synchronized with said TDM switch based upon said beacon sign recovery electonics generating said data signal.

7. The processing satellite communication system as recited in claim 6, wherein said beacon signal is a pseudorandom number sequence.

8. The processing satellite communication system as recited in claim 6, wherein said beacon signal and said data signals are generated at baseband.

9. The processing satellite communication system as recited in claim 6, wherein said beacon signal defines said downlink frame structure.

10. The processing satellite communication system as recited in claim 6, wherein said beacon signal and said data signal share a same radio frequency path.

11. A method for satellite system synchronization comprising the steps of:
 generating a data signal;
 generating a beacon signal using a pseudorandom number generator that is reset to a preset state using a reset signal;
 generating a timing signal;
 multiplexing said data signal to generate a downlink frame having N downlink frame slots, wherein one of said N downlink frame slots comprises said beacon signal to generate a TDMA signal;
 modulating said TDMA signal to generate a downlink frame having N downlink frame slots, wherein one of said N downlink frame slots comprises said beacon signal to generate a TDMA signal;
 modulating said TDMA signal to generate a modulated TDMA signal;
 broadcasting said modulated TDMA signal;
 receiving said modulated TDMA signal;
 demodulating said modulated TDMA signal to generate said TDMA signal;
 extracting said beacon signal from said TDMA signal;
 synchronizing a ground station terminal using said beacon signal; and
 extracting said data signal from said TDMA signal based upon said beacon signal.

* * * * *